United States Patent
Wu et al.

(10) Patent No.: US 12,094,162 B2
(45) Date of Patent: Sep. 17, 2024

(54) PURE POSE SOLUTION METHOD AND SYSTEM FOR MULTI-VIEW CAMERA POSE AND SCENE

(71) Applicant: SHANGHAI JIAO TONG UNIVERSITY, Shanghai (CN)

(72) Inventors: Yuanxin Wu, Shanghai (CN); Qi Cai, Shanghai (CN); Lilian Zhang, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 211 days.

(21) Appl. No.: 17/785,015

(22) PCT Filed: Dec. 31, 2019

(86) PCT No.: PCT/CN2019/130316
§ 371 (c)(1),
(2) Date: Jun. 13, 2022

(87) PCT Pub. No.: WO2021/114434
PCT Pub. Date: Jun. 17, 2021

(65) Prior Publication Data
US 2023/0041433 A1   Feb. 9, 2023

(30) Foreign Application Priority Data
Dec. 11, 2019   (CN) .......................... 201911267354.1

(51) Int. Cl.
*G06T 7/73*   (2017.01)
*G06T 3/60*   (2024.01)

(52) U.S. Cl.
CPC ............ *G06T 7/74* (2017.01); *G06T 3/60* (2013.01); *G06T 2207/30204* (2013.01)

(58) Field of Classification Search
CPC ............ G06T 7/74; G06T 3/60; G06T 2207/30204; G06T 7/70; G06T 7/55; G06T 2207/30244; G06T 7/80; Y02T 10/40
See application file for complete search history.

(56) References Cited

U.S. PATENT DOCUMENTS

| | | | |
|---|---|---|---|
| 11,704,787 B2 * | 7/2023 | Dwivedi | G06T 7/50 382/103 |
| 2017/0083751 A1 * | 3/2017 | Tuzel | G06V 40/171 |

(Continued)

FOREIGN PATENT DOCUMENTS

| | | | | |
|---|---|---|---|---|
| CN | 106289188 A | * | 1/2017 | |
| CN | 106408653 A | * | 2/2017 | G06T 17/00 |

(Continued)

*Primary Examiner* — Pinalben Patel
(74) *Attorney, Agent, or Firm* — Bayramoglu Law Offices LLC

(57) ABSTRACT

A pure pose solution method and system for a multi-view camera pose and scene are provided. The method includes: a pure rotation recognition (PRR) step: performing PRR on all views, and marking views having a pure rotation abnormality, to obtain marked views and non-marked views; a global translation linear (GTL) calculation step: selecting one of the non-marked views as a reference view, constructing a constraint $t_r=0$, constructing a GTL constraint, solving a global translation (I), reconstructing a global translation of the marked views according to $t_r$ and (I), and screening out a correct solution of the global translation; and a structure analytical reconstruction (SAR) step: performing analytical reconstruction on coordinates of all 3D points according to a correct solution of a global pose. The method and system can greatly improve the computational efficiency and robustness of the multi-view camera pose and scene structure reconstruction.

11 Claims, 1 Drawing Sheet

(56) References Cited

U.S. PATENT DOCUMENTS

| | | | |
|---|---|---|---|
| 2018/0071032 A1* | 3/2018 | de Almeida Barreto | ................... G06T 19/006 |
| 2019/0130590 A1 | 5/2019 | Volochniuk et al. | |
| 2022/0198695 A1* | 6/2022 | Luo | ........................ G06V 20/64 |
| 2023/0186519 A1* | 6/2023 | Wu | ........................ G06T 7/579 382/103 |

FOREIGN PATENT DOCUMENTS

| CN | 107507277 A | 12/2017 |
|---|---|---|
| CN | 108038902 A | 5/2018 |
| CN | 109993113 A | 7/2019 |

\* cited by examiner

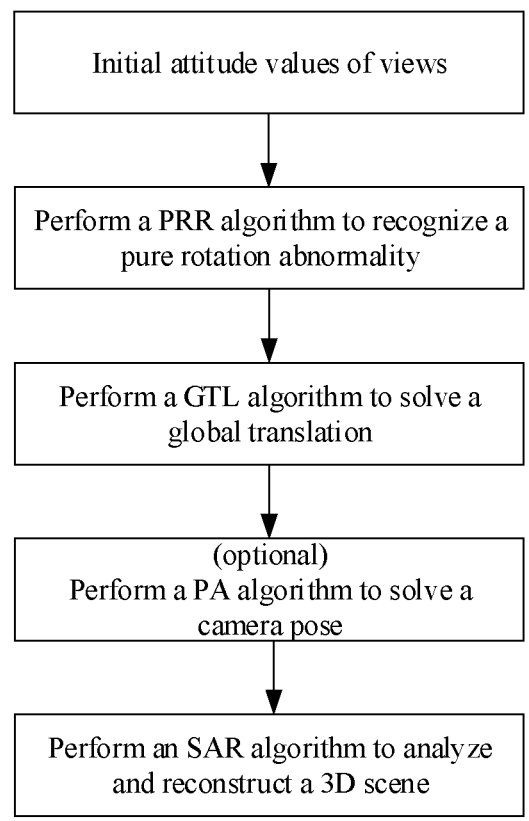

PURE POSE SOLUTION METHOD AND SYSTEM FOR MULTI-VIEW CAMERA POSE AND SCENE

CROSS REFERENCE TO THE RELATED APPLICATIONS

This application is the national phase entry of International Application No. PCT/CN2019/130316, filed on Dec. 31, 2019, which is based upon and claims priority to Chinese Patent Application No. 201911267354.1, filed on Dec. 11, 2019, the entire contents of which are incorporated herein by reference.

TECHNICAL FIELD

The present disclosure relates to the field of computer vision, and in particular, to a pure pose solution method and system for a multi-view camera pose and scene.

BACKGROUND

Reconstruction of camera pose and scene structure has always been the core of reconstruction structure from motion in computer vision. In the conventional multi-view geometric description, the reconstruction of camera pose and scene structure requires initialization of global parameters and bundle adjustment (BA). On the one hand, the initialization of global parameters provides initial values for the BA and mainly includes initialization of global attitude, global translation, and three-dimensional (3D) scene point coordinates, where the difficulty lies in the initialization of global translation. The conventional global translation method generally takes a relative translation of two views as an input and optimizes the global translation by minimizing an algebraic error. Abnormalities may occur in cases such as camera pure rotation or co-linear motion in the conventional global translation method. On the other hand, the objective of the BA is to minimize a re-projection error. A parameter space includes 3D scene point coordinates, a pose parameter, a camera parameter, and others. In the case of m 3D scene points and n images, the space dimensionality of parameters to be optimized is 3m+6n. There are generally a large number of 3D scene points, resulting in high space dimensionality of the parameters to be optimized.

A patent (Patent Publication No. CN106408653A) discloses a real-time robust bundle adjustment method for large-scale 3D reconstruction. The current mainstream BA method is a nonlinear optimization algorithm considering the sparsity of a parametric Jacobian matrix, but the method still fails to meet the real-time and robustness requirements in large-scale scenes.

SUMMARY

To solve the defects in the prior art, an objective of the present disclosure is to provide a pure pose solution method and system for a multi-view camera pose and scene.

The present disclosure provides a pure pose solution method for a multi-view camera pose and scene, where the method uses initial attitude values of views as an input and includes:

a pure rotation recognition (PRR) step: performing PRR on all views and marking views having a pure rotation abnormality to obtain marked views and non-marked views;

a global translation linear (GTL) calculation step: selecting one of the non-marked views as a reference view, constructing a constraint $t_r=0$, constructing a GTL constraint, solving a global translation $\hat{t}$, reconstructing a global translation of the marked views according to $t_r$ and $\hat{t}$, and screening out a correct solution of the global translation; and a structure analytical reconstruction (SAR) step: performing analytical reconstruction on coordinates of all 3D points according to a correct solution of a global pose.

Preferably, the PRR step includes the following steps:

step 1: for a view i ($1 \leq i \leq N$) and a view $j \in V_i$, calculating $\theta_{i,j}=\|[X_j]_x R_{i,j} X_i\|$ by using all image matching point pairs $(X_i, X_j)$ and a relative attitude $R_{i,j}$ of dual views $(i,j)$ and constructing sets $$\Theta_{i,j} \text{ and } \Theta_i = \bigcup_{j \in V_i} \Theta_{i,j},$$

where a proportion of elements in $\Theta_i$ that are greater than $\delta_1$ is denoted by $\gamma_i$;

step 2: if $\gamma 1 < \delta_2$, marking the view i as a pure rotation abnormality view, recording a mean value of elements in the set $\Theta_{i,j}$ as $\bar{\theta}_{i,j}$, letting $$l = \underset{j \in V_i}{\mathrm{argmin}}\{\bar{\theta}_{i,j}\},$$

and constructing a constraint $t_i=t_l$;

where if a 3D point $X^W=(x^W, y^W, z^W)^T$ is visible in n ($\leq N$) views, for $i=1, 2, \ldots, n$, $V_i$ is a set composed of all co-views of the view i; $X_i$ and $X_j$ represent normalized image coordinates of a point $X^W$ on the view i and the view j, respectively; $\delta_1$ and $\delta_2$ are specified thresholds; $R_i$ and $t_i$ represent a global attitude and a global translation of the view i, respectively; $R_{i,j}$ ($=R_j R_i^T$) and $t_{i,j}$ represent a relative attitude and a relative translation of the dual views (i,j), respectively; and $[X_j]_x$ represents an antisymmetric matrix formed by vectors $X_j$; and step 3: repeating step 1 to step 2 for all the views.

Preferably, the GTL calculation step includes the following steps:

step 1: for a current 3D point, selecting views $$(\varsigma, \eta) = \underset{1 \leq i,j \leq n}{\mathrm{argmax}}\{\theta_{i,j}\},$$

where $\varsigma$ is a left baseline view, and $\eta$ is a right baseline view;

step 2: for all the non-marked views (excluding the reference view), constructing a GTL constraint according to the form of $Bt_\eta + Ct_\varsigma + Dt_\varsigma = 0$;

where normalized image coordinates of a 3D point $x^W$ on the view i include $X_i \sim R_{\varsigma,i} X_\varsigma a^T t_{\varsigma,\eta} + \theta_{\varsigma,\eta}^2 t_{\varsigma,i} \sqsubset Y_i$, ~ represents an equation under homogeneous coordinates, $a^T=-([X_\eta]_x R_{\varsigma,\eta} X_\varsigma)^T [X_\eta]_x$, and the superscript T represents transposition of a matrix or vector. In order to solve the global translation linearly, different target function forms are defined. For example, $(I_3-X_i e_3^T)Y_i=0$ and $[X_i]_x Y_i=0$; $I_3$ represents a 3D unit matrix and $e_3$ represents a third-column vector $e_3=(0,0,1)^T$ of the unit matrix. In addition, because the relative translation $t_{i,j}$ has different forms with respect to the global translation, for example, $t_{i,j}=R_j(t_i-t_j)$ and $t_{i,j}=t_j-R_{i,j}t_i$, matrices B, C, and D also have different forms correspondingly:

(1) for the target function $[X_i]_x Y_i = 0$ and the relative translation $t_{i,j} = R_j(t_i - t_j)$: $B = [X_i]_x R_{\varsigma,j} X_\varsigma a^T R_\eta$, $C = [X_i]_x \theta_{\varsigma,\eta}^2 R_i$, $D = -(B+C)$;

(2) for the target function $(I_3 - X_i e_3^T) Y_i = 0$ the relative translation $t_{i,j} = R_j(t_i - t_j)$: $B = (I_3 - X_i e_3^T) R_{\varsigma,j} X_\varsigma a^T R_\eta$, $C = (I_3 - X_i e_3^T) \theta_{\varsigma,\eta}^2 R_i$, $D = -(B+C)$;

(3) for the target function $[X_i]_x Y_i = 0$ and the relative translation $t_{i,j} = t_j - R_{i,j} t_i$: $B = [X_i]_x R_{\varsigma,j} X_\varsigma a^T$, $C = [X_i]_x \theta_{\varsigma,\eta}^2$, $D = -(BR_{\varsigma,\eta} + CR_{\varsigma,i})$; and (4) for the target function $(I_3 - X_i e_3^T) Y_i = 0$ and the relative translation $t_{i,j} = t_j - R_{i,j} t_i$: $B = (I_3 - X_i e_3^T) R_{\varsigma,j} X_\varsigma a^T$, $C = (I_3 - X_i e_3^T) \theta_{\varsigma,\eta}^2$, $D = -(BR_{\varsigma,\eta} + CR_{\varsigma,i})$;

step 3: repeating step 1 to step 2 for other 3D points, constructing a linear equation, and solving the global translation i;

step 4: reconstructing the global translation of the marked views according to $t_i = t_l$ by using $\hat{t}$ and $t_r$; and step 5: screening out the correct solution of the global translation t according to $a^T t_{\varsigma,\eta} \geq 0$.

Preferably, an optional camera pose optimization step is added between the GTL calculation step and the SAR step:

expressing image homogeneous coordinates $f_i$ of the 3D point $X^W$ on the view i as follows:

$$f_i \sim d_\varsigma^{(\varsigma,\eta)} R_{\varsigma,i} X_\varsigma + t_{\varsigma,i}$$

where ~ represents an equation under homogeneous coordinates, $d_\varsigma^{(\varsigma,\eta)} = \|[X_\eta]_x t_{\varsigma,\eta}\|/\theta_{\varsigma,\eta}$, and a re-projection error is defined as follows:

$$\varepsilon_i = \frac{f_i}{e_3^T f_i} - \tilde{f}_i$$

where $\tilde{f}_i$ represents image coordinates of a 3D point on the view i and a third element is 1. For all views of the 3D point, a re-projection error vector $\varepsilon$ is formed. For all 3D points, an error vector $\Sigma$ is formed. A target function of global pose optimization is described as arg min $\Sigma^T \Sigma$, and an optimization solution of the global pose is calculated accordingly. It should be noted that the camera pose optimization step may be replaced with another optimization algorithm, such as a classic BA algorithm; in this case, the 3D scene point coordinates may adopt an output result of the classic BA algorithm or may be obtained by using the following SAR step.

Preferably, the SAR step includes:

performing analytical and weighted reconstruction on a multi-view 3D scene structure according to a camera pose;

for a current 3D point, calculating a depth of field in the left baseline view $\varsigma$:

$$\hat{z}_\varsigma^W = \sum_{\substack{1 \leq j \leq n \\ j \neq \varsigma}} \omega_{\varsigma,j} d_\varsigma^{(\varsigma,j)}$$

calculating a depth of field in the right baseline view:

$$\hat{z}_\eta^W = \sum_{\substack{1 \leq j \leq n \\ j \neq \eta}} \omega_{j,\eta} d_\eta^{(j,\eta)}$$

where $d_\eta^{(j,\eta)} = \|[R_{j,\eta} X_j]_x t_{j,\eta}\|/\theta_{j,\eta}$, $\omega_{\varsigma,j}$ and $\omega_{j,\eta}$ represent weighting coefficients. For example, in analytical reconstruction of a 3D point based on the depth of field in the left baseline view, it is specified that $$\omega_{\varsigma,j} = \theta_{\varsigma,j} \Big/ \sum_{\substack{1 \leq j \leq n \\ j \neq \varsigma}} \theta_{\varsigma,j},$$

and in this case, coordinates of the current 3D feature point are as follows:

$$X^W = \hat{z}_\varsigma^W R_\varsigma^T X_\varsigma + t_\varsigma$$

Coordinates of all the 3D points can be obtained through analytical reconstruction. Similarly, the coordinates of the 3D points can be obtained through analytical reconstruction based on the depth of field in the right baseline view. An arithmetic mean of the foregoing two categories of coordinate values of the 3D points can be calculated.

The present disclosure provides a pure pose solution system for a multi-view camera pose and scene, including:

a PRR module configured to perform PRR on all views, and mark views having a pure rotation abnormality to obtain marked views and non-marked views;

a GTL calculation module configured to select one of the non-marked views as a reference view, construct a constraint $t_r = 0$, construct a GTL constraint, solve a global translation $\hat{t}$, reconstruct a global translation of the marked views according to $t_r$ and $\hat{t}$, and screen out a correct solution of the global translation; and an SAR module configured to perform analytical reconstruction on coordinates of all 3D points according to a correct solution of a global pose.

Preferably, the PRR module includes the following modules:

a module M11 configured to: for a view i ($1 \leq i \leq N$) and a view $j \in V_i$, calculate $\theta_{i,j} = \|[X_j]_x R_{i,j} X_i\|$ by using all image matching point pairs $(X_i, X_j)$ and a relative attitude $R_{i,j}$ of dual views (i,j) and construct sets $\Theta_{i,j}$ and $$\Theta_i = \bigcup_{j \in V_i} \Theta_{i,j},$$

where a proportion of elements in $\Theta_i$ that are greater than $\delta_1$ is denoted by $\gamma_i$;

a module M12 configured to: if $\gamma_i < \delta_2$, mark the view i as a pure rotation abnormality view, record a mean value of elements in the set $\Theta_{i,j}$ as $\overline{\theta}_{i,j}$, let $$l = \arg\min_{j \in V_i} \{\overline{\theta}_{i,j}\},$$

and construct a constraint $t_i = t_l$;

where if a 3D point $X^W = (x^W, y^W, z^W)^T$ is visible in n ($\leq N$) views, for i=1, 2 ..., n, $V_i$ is a set composed of all co-views of the view i; $X_i$ and $X_j$ represent normalized image coordinates of a point $X^W$ on the view i and the view j, respectively; $\delta_1$ and $\delta_2$ are specified thresholds; $R_i$ and $t_i$ represent a global attitude and a global translation of the view i, respectively; $R_{i,j}$ ($=R_j R_i^T$) and $t_{i,j}$ represent a relative attitude and a relative translation of the dual views (i,j), respectively; and $[X_j]_x$ represents an antisymmetric matrix formed by vectors $X_j$; and a module M13 configured to repeat operations of the module M11 to the module M12 for all the views.

Preferably, the GTL calculation module includes:

a module M21 configured to: for a current 3D point, select views $$(\varsigma, \eta) = \underset{1 \leq i,j \leq n}{\mathrm{argmax}} \{\theta_{i,j}\},$$

where $\varsigma$ is a left baseline view, and $\eta$ is a right baseline view;

a module M22 configured to: for all the non-marked views, construct a GTL constraint according to the form of $Bt_\eta + Ct_i + Dt_\varsigma = 0$;

where normalized image coordinates of a 3D point $X^W$ on the view i include $X_i \sim R_{\varsigma,i} X_\varsigma a^T t_{\varsigma,\eta} + \theta^2_{\varsigma,\eta} t_{\varsigma,i} \sqsubset Y_i$, $\sim$ represents an equation under homogeneous coordinates, $a^T = -([X_\eta]_x R_{\varsigma,\eta} X_\varsigma)^T [X_\eta]_x$, and the superscript T represents transposition of a matrix or vector;

In addition, because the relative translation $t_{i,j}$ has different forms with respect to the global translation, matrices B, C, and D also have different forms correspondingly:

(1) for the target function $[X_i]_x Y_i = 0$ and the relative translation $t_{i,j} = R_j(t_i - t_j)$: $B = [X_i]_x R_{\varsigma,i} X_\varsigma a^T R_\eta$, $C = [X_i]_x \theta^2_{\varsigma,\eta} R_i$, $D = -(B+C)$;

(2) for the target function $(I_3 - X_i e_3^T) Y_i = 0$ and the relative translation $t_{i,j} = R_j(t_i - t_j)$: $B = (I_3 - X_i e_3^T) R_{\varsigma,i} X_\varsigma a^T R_\eta$, $C = (I_3 - X_i e_3^T) \theta^2_{\varsigma,\eta} R_i$, $D = -(B+C)$;

(3) for the target function $[X_i]_x Y_i = 0$ and the relative translation $t_{i,j} = t_j - R_{i,j} t_i$: $B = [X_i]_x R_{\varsigma,i} X_\varsigma a^T$, $C = [X_i]_x \theta^2_{\varsigma,\eta}$, $D = -(BR_{\varsigma,\eta} + CR_{\varsigma,i})$; and (4) for the target function $(I_3 - X_i e_3^T) Y_i = 0$ and the relative translation $t_{i,j} = t_j - R_{i,j} t_i$: $B = (I_3 - X_i e_3^T) R_{\varsigma,i} X_\varsigma a^T$, $C = (I_3 - X_i e_3^T) \theta^2_{\varsigma,\eta}$, $D = -(BR_{\varsigma,\eta} + CR_{\varsigma,i})$;

a module M23 configured to repeat operations of the module M21 to the module M22 for other 3D points, construct a linear equation, and solve the global translation $\hat{t}$;

a module M24 configured to reconstruct the global translation of the marked views according to $t_i = t_l$ by using $\hat{t}$ and $t_r$; and a module M25 configured to screen out the correct solution of the global translation t according to $a^T t_{\varsigma,\eta} \geq 0$.

Preferably, the system further includes a camera pose optimization module configured to: express image homogeneous coordinates $f_i$ of the 3D point $X^W$ on the view i as follows:

$$f_i \sim d_\varsigma^{(\varsigma,\eta)} R_{\varsigma,i} X_\varsigma + t_{\varsigma,i}$$

where $\sim$ represents an equation under homogeneous coordinates, $d_\varsigma^{(\varsigma,\eta)} = \|[X_\eta]_x t_{\varsigma,\eta}\| / \theta_{\varsigma,\eta}$, and a re-projection error is defined as follows:

$$\varepsilon_i = \frac{f_i}{e_3^T f_i} - \tilde{f}_i$$

where $e_3^T = (0,0,1)$, $\tilde{f}_i$ represents image coordinates of a 3D point on the view i and a third element is 1. For all views of the 3D point, a re-projection error vector $\varepsilon$ is formed. For all 3D points, an error vector $\Sigma$ is formed. A target function of global pose optimization is described as arg min $\Sigma^T \Sigma$, and an optimization solution of the global pose is calculated accordingly.

Alternatively, the camera pose optimization step is replaced with a classic BA algorithm; in this case, the 3D scene point coordinates adopt an output result of the classic BA algorithm or are obtained by using the SAR step.

Preferably, the SAR module is configured to:

perform analytical and weighted reconstruction on a multi-view 3D scene structure according to a camera pose;

for a current 3D point, calculate a depth of field in the left baseline view $\varsigma$:

$$\hat{z}_\varsigma^W = \sum_{\substack{1 \leq j \leq n \\ j \neq \varsigma}} \omega_{\varsigma,j} d_\varsigma^{(\varsigma,j)}$$

calculate a depth of field in the right baseline view:

$$\hat{z}_\eta^W = \sum_{\substack{1 \leq j \leq n \\ j \neq \eta}} \omega_{j,\eta} d_\eta^{(j,\eta)}$$

where $d_\eta^{(j,\eta)} = \|[R_{j,\eta} X_j]_x t_{j,\eta}\| / \theta_{j,\eta}$, $\omega_{\varsigma,j}$ and $\omega_{j,\eta}$ represent weighting coefficients; and perform analytical reconstruction to obtain coordinates of all the 3D points accordingly; or perform analytical reconstruction to obtain coordinates of the 3D points by using the depth of field of the right baseline view, or calculate an arithmetic mean of the foregoing two categories of coordinate values of the 3D points.

Compared with the prior art, the present disclosure has the following beneficial effects.

The present disclosure solves the bottleneck problem of traditional initial value and optimization methods and can substantially improve the robustness and computational speed of the camera pose and scene structure reconstruction.

BRIEF DESCRIPTION OF THE DRAWINGS

Other features, objectives, and advantages of the present disclosure will become more apparent by reading the detailed description of non-limiting embodiments with reference to the following accompanying drawings.

FIGURE is a flowchart of the present disclosure.

DETAILED DESCRIPTION OF THE EMBODIMENTS

The present disclosure is described in detail below with reference to specific embodiments. The following embodiments will help those skilled in the art to further understand the present disclosure, but they do not limit the present disclosure in any way. It should be noted that several variations and improvements can also be made by a person of ordinary skill in the art without departing from the ideas of the present disclosure. These all fall within the protection scope of the present disclosure.

As shown in FIGURE, the present disclosure provides a pure pose solution method for a multi-view camera pose and scene, where the method uses initial attitude values of views as an input and includes the following steps:

PRR step: Perform PRR on all views and mark views having a pure rotation abnormality to obtain marked views and non-marked views.

GTL calculation step: Select one of the non-marked views as a reference view, construct a constraint $t_r=0$, construct a GTL constraint, solve a global translation $\hat{t}$, reconstruct a global translation of the marked views according to $t_r$ and $\hat{t}$, and screen out a correct solution of the global translation.

SAR step: Perform analytical reconstruction on coordinates of all 3D points according to a correct solution of a global pose.

The PRR step includes the following steps:

Step 1: For a view i ($1 \leq i \leq N$) and a view $j \in V_i$, calculate $\theta_{i,j} = \|[X_j]_x R_{i,j} X_i\|$ by using all image matching point pairs $(X_i, X_j)$ and a relative attitude $R_{i,j}$ of dual views (i,j) and construct sets $\Theta_{i,j}$ and $$\Theta_i = \bigcup_{j \in V_i} \Theta_{i,j},$$

where a proportion of elements in $\Theta_i$ that are greater than $\delta_1$ is denoted by $\gamma_i$.

Step 2: If $\gamma_i < \delta_2$, mark the view i as a pure rotation abnormality view, record a mean value of elements in the set $\Theta_{i,j}$ as $\bar{\theta}_{i,j}$, letting $$l = \underset{j \in V_i}{\arg\min} \{\bar{\theta}_{i,j}\},$$

and construct a constraint $t_i = t_l$.

If a 3D point $X^W = (x^W, y^W, z^W)^T$ is visible in n ($\leq N$) views, for $i=1, 2, \ldots, n$, $V_i$ is a set composed of all co-views of the view i; $X_i$ and $X_j$ represent normalized image coordinates of a point $X^W$ on the view i and the view j, respectively; $\delta_1$ and $\delta_2$ are specified thresholds; $R_i$ and $t_i$ represent a global attitude and a global translation of the view i, respectively; $R_{i,j}(=R_j R_i^T)$ and $t_{i,j}$ represent a relative attitude and a relative translation of the dual views (i,j), respectively; and $[X_j]_x$ represents an antisymmetric matrix formed by vectors $X_j$.

Step 3: Repeat step 1 to step 2 for all the views.

The GTL calculation step includes the following steps:

Step 1: For a current 3D point, select views $$(\varsigma, \eta) = \underset{1 \leq i, j \leq n}{\arg\max} \{\theta_{i,j}\},$$

where $\varsigma$ is a left baseline view and $\eta$ is a right baseline view.

Step 2: For all the non-marked views (excluding the reference view), construct a GTL constraint according to the form of $Bt_\eta + Ct_i + Dt_\varsigma = 0$.

Normalized image coordinates of a 3D point $X^W$ on the view i include $X_i \sim R_{\varsigma,i} X_\varsigma a^T t_{\varsigma,\eta} + \theta_{\varsigma,\eta}^2 t_{\varsigma,i} \sqsupset Y_i$, ~ represents an equation under homogeneous coordinates, $a^T = -([X_\eta]_x R_{\varsigma,\eta} X_\varsigma)^T [X_\eta]_x$, and the superscript T represents transposition of a matrix or vector. In order to solve the global translation linearly, different target function forms are defined, for example, $(I_3 - X_i e_3^T) Y_i = 0$ and $[X_i]_x Y_i = 0$. $I_3$ represents a 3D unit matrix, and $e_3$ represents a third-column vector $e_3 = (0,0,1)^T$ of the unit matrix. In addition, because the relative translation $t_{i,j}$ has different forms with respect to the global translation, for example, $t_{i,j} = R_j(t_i - t_j)$ and $t_{i,j} = t_j - R_{i,j} t_i$, matrices B, C, and D of also have different forms:

(1) for the target function $[X_i]_x Y_i = 0$ and the relative translation $t_{i,j} = R_j(t_i - t_j)$: $B = [X_i]_x R_{\varsigma,i} X_\varsigma a^T R_\eta$, $C = [X_i]_x \theta_{\varsigma,\eta}^2 R_i$, $D = -(B+C)$;

(2) for the target function $(I_3 - X_i e_3^T) Y_i = 0$ and the relative translation $t_{i,j} = R_j(t_i - t_j)$: $B = (I_3 - X_i e_3^T) R_{\varsigma,i} X_\varsigma a^T R_\eta$, $C = (I_3 - X_i e_3^T) \theta_{\varsigma,\eta}^2 R_i$, $D = -(B+C)$;

(3) for the target function $[X_i]_x Y_i = 0$ and the relative translation $t_{i,j} = t_j - R_{i,j} t_i$: $B = [X_i]_x R_{\varsigma,i} X_\varsigma a^T$, $C = [X_i]_x \theta_{\varsigma,\eta}^2$, $D = -(BR_{\varsigma,\eta} + CR_{\varsigma,i})$; and (4) for the target function $(I_3 - X_i e_3^T) Y_i = 0$ and the relative translation $t_{i,j} = t_j - R_{i,j} t_i$: $B = (I_3 - X_i e_3^T) R_{\varsigma,i} X_\varsigma a^T$, $C = (I_3 - X_i e_3^T) \theta_{\varsigma,\eta}^2$, $D = -(BR_{\varsigma,\eta} + CR_{\varsigma,i})$.

Step 3: Repeat step 1 to step 2 for other 3D points, construct a linear equation, and solve the global translation $\hat{t}$.

Step 4: Reconstruct the global translation of the marked views according to $t_i = t_l$ by using $\hat{t}$ and $t_r$.

Step 5: Screen out the correct solution of the global translation t according to $a^T t_{\varsigma,\eta} \geq 0$.

An optional camera pose optimization step is added between the GTL calculation step and the SAR step:

Express image homogeneous coordinates $f_i$ of the 3D point $X^W$ on the view i as follows:

$$f_i \sim d_\varsigma^{(\varsigma,\eta)} R_{\varsigma,i} X_\varsigma + t_{\varsigma,i}$$

where ~ represents an equation under homogeneous coordinates, $d_\varsigma^{(\varsigma,\eta)} = \|[X_\eta]_x t_{\varsigma,\eta}\| / \theta_{\varsigma,\eta}$, and a re-projection error is defined as follows:

$$\varepsilon_i = \frac{f_i}{e_3^T f_i} - \tilde{f}_i$$

where $\tilde{f}_i$ represents image coordinates of a 3D point on the view i and a third element is 1. For all views of the 3D point, a re-projection error vector $\varepsilon$ is formed. For all 3D points, an error vector $\Sigma$ is formed. A target function of global pose optimization is described as $\arg\min \Sigma^T \Sigma$, and an optimization solution of the global pose is calculated accordingly. It should be noted that the camera pose optimization step may be replaced with another optimization algorithm, such as a classic BA algorithm; in this case, the 3D scene point coordinates may adopt an output result of the classic BA algorithm or may be obtained by using SAR step.

The SAR step includes:

performing analytical and weighted reconstruction on a multi-view 3D scene structure according to a camera pose.

For a current 3D point, a depth of field in the left baseline view $\varsigma$ is calculated as follows:

$$\hat{z}_\varsigma^W = \sum_{\substack{1 \leq j \leq n \\ j \neq \varsigma}} \omega_{\varsigma,j} d_\varsigma^{(\varsigma,j)}$$

A depth of field in the right baseline view is calculated as follows:

$$\hat{z}_\eta^W = \sum_{\substack{1 \le j \le n \\ j \ne \eta}} \omega_{j,\eta} d_\eta^{(j,\eta)}$$

where $d_\eta^{(j,\eta)} = \|[R_{j,\eta}X_j]_x t_{j,\eta}\|/\theta_{j,\eta}$, $\omega_{\varsigma,j}$ and $\omega_{j,\eta}$ represent weighting coefficients. For example, in analytical reconstruction of a 3D point based on the depth of field in the left baseline view, it is specified that $$\omega_{\varsigma,j} = \theta_{\varsigma,j} / \sum_{\substack{1 \le j \le n \\ j \ne \varsigma}} \theta_{\varsigma,j},$$

and in this case, coordinates of the current 3D feature point are as follows:

$$X^W = \hat{z}_\varsigma^W R_\varsigma^T X_\varsigma + t_\varsigma$$

Coordinates of all the 3D points can be obtained through analytical reconstruction. Similarly, the coordinates of the 3D points can be obtained through analytical reconstruction based on the depth of field in the right baseline view. An arithmetic mean of the foregoing two categories of coordinate values of the 3D points can be calculated.

Based on the foregoing pure pose solution method for a multi-view camera pose and scene, the present disclosure further provides a pure pose solution system for a multi-view camera pose and scene, including:

a PRR module configured to perform PRR on all views, and mark views having a pure rotation abnormality, to obtain marked views and non-marked views;

a GTL calculation module configured to select one of the non-marked views as a reference view, construct a constraint $t_r=0$, construct a GTL constraint, solve a global translation $\hat{t}$, reconstruct a global translation of the marked views according to $t_r$ and $\hat{t}$, and screen out a correct solution of the global translation; and an SAR module configured to perform analytical reconstruction on coordinates of all 3D points according to a correct solution of a global pose.

Those skilled in the art are aware that in addition to being realized by using pure computer-readable program code, the system and each apparatus, module, and unit thereof provided in the present disclosure can realize a same program in a form of a logic gate, a switch, an application-specific integrated circuit, a programmable logic controller, or an embedded microcontroller by performing logic programming on the method steps. Therefore, the system and each apparatus, module, and unit thereof provided in the present disclosure can be regarded as a hardware component. The apparatus, module, and unit included therein for realizing various functions can also be regarded as a structure in the hardware component; the apparatus, module and unit for realizing the functions can also be regarded as a software program for implementing the method or a structure in the hardware component.

The specific embodiments of the present disclosure are described above. It should be understood that the present disclosure is not limited to the above specific implementations, and a person skilled in the art can make various variations or modifications within the scope of the claims without affecting the essence of the present disclosure. The embodiments in the present disclosure and features in the embodiments may be arbitrarily combined with each other in a non-conflicting manner.

What is claimed is:

1. A pure pose solution method for a multi-view camera pose and scene, comprising:
    a pure rotation recognition (PRR) step, wherein the PRR step comprises performing a PRR on views, and marking views having a pure rotation abnormality of the views to obtain marked views indicating pure rotation abnormality and non-marked views;
    a global translation linear (GTL) calculation step, wherein the GTL calculation step comprises selecting one of the non-marked views as a reference view, constructing a constraint $t_r=0$, constructing a GTL constraint, solving a global translation $\hat{t}$, reconstructing a global translation of the marked views according to $t_r$ and $\hat{t}$, and screening out a correct solution of the global translation; and
    a structure analytical reconstruction (SAR) step, wherein the SAR step comprises performing an analytical reconstruction on coordinates of 3D points according to a correct solution of a global pose,
    wherein the PRR step further comprises:
    step 1: for a view i ($1 \le i \le N$) and a view j ($j \in V_i$), calculating $\theta_{i,j} = \|[X_j]_x R_{i,j} X_i\|$ by using image matching point pairs ($X_i, X_j$) and a relative attitude $R_{i,j}$ of dual views (i,j), and constructing a set $\Theta_{i,j}$ and a set $$\Theta_i = \bigcup_{j \in V_i} \Theta_{i,j},$$

wherein a proportion of elements, greater than $\delta_1$, in $\Theta_i$ is denoted by $\gamma_i$.

2. The pure pose solution method according to claim 1, wherein the PRR step further comprises:
    step 2: when $\gamma_i < \delta_2$, marking the view i as a pure rotation abnormality view, recording a mean value of elements in the set $\Theta_{i,j}$ as $\overline{\theta}_{i,j}$, letting $$l = \operatorname*{argmin}_{j \in V_i} \{\overline{\theta}_{i,j}\},$$

and constructing a constraint $t_i = t_l$;
    wherein when a 3D point $X^W = (x^W, y^W, z^W)^T$ is visible in n ($\le N$) views, for i=1, 2 ..., n, $V_i$ is a set configured with co-views of the view i; $X_i$ and $X_j$ represent a normalized image coordinate of the 3D point $X^W$ on the view i and a normalized image coordinate of the 3D point $X^W$ on the view j, respectively; $\delta_1$ and $\delta_2$ are specified thresholds; $R_i$ and $t_i$ represent a global attitude of the view i and a global translation of the view i, respectively; $R_{i,j}$ ($=R_j R_i^T$) and $t_{i,j}$ represent a relative attitude of the dual views (i,j) and a relative translation of the dual views (i,j), respectively; and $[X_j]_x$ represents an antisymmetric matrix formed by vectors $X_j$; and
    step 3: repeating step 1 to step 2 for the views.

3. The pure pose solution method according to claim 2, wherein the GTL calculation step comprises:
    step 3: for a current 3D point, selecting views $$(\varsigma, \eta) = \operatorname*{argmax}_{1 \le i,j \le n} \{\theta_{i,j}\},$$

wherein $\varsigma$ is a left baseline view, and $\eta$ is a right baseline view;

step 4: for the non-marked views, constructing the GTL constraint according to a form of $Bt_\eta + Ct_\zeta + Dt_\varsigma = 0$; wherein the normalized image coordinate of the 3D point $X^W$ on the view i comprise $X_i \sim R_{\varsigma,i} X_\varsigma a^T t_{\varsigma,\eta} + \theta_{\varsigma,\eta}^2 t_{\varsigma,i} \triangleq Y_i$, $\sim$ represents an equation under homogeneous coordinates, $a^T = -([X_\eta]_x R_{\varsigma,\eta} X_\varsigma)^T [X_\eta]_x$, and a superscript T represents a transposition of a matrix or a transposition of a vector; and different target function forms are defined to solve the global translation linearly;

wherein the relative translation $t_{i,j}$ has different forms corresponding to the global translation, a matrix B, a matrix C, and a matrix D have different forms:

(1) for a target function $[X_i]_x Y_i = 0$ and the relative translation $t_{i,j} = R_j(t_i - t_j)$: $B = [X_i]_x R_{\varsigma,j} X_\varsigma a^T R_\eta$, $C = [X_i]_x \theta_{\varsigma,\eta}^2 R_i$, $D = -(B+C)$;

(2) for a target function $(I_3 - X_i e_3^T) Y_i = 0$ and the relative translation $t_{i,j} = R_j(t_i - t_j)$: $B = (I_3 - X_i e_3^T) R_{\varsigma,j} X_\varsigma a^T R_\eta$, $C = (I_3 - X_i e_3^T) \theta_{\varsigma,\eta}^2 R_i$, $D = -(B+C)$;

(3) for the target function $[X_i] Y_i = 0$ and the relative translation $t_{i,j} = t_j - R_{i,j} t_i$: $B = [X_i]_x R_{\varsigma,j} X_\varsigma a^T$, $C = [X_i]_x \theta_{\varsigma,\eta}^2$, $D = -(BR_{\varsigma,\eta} + CR_{\varsigma,i})$; and (4) for the target function $(I_3 - X_i e_3^T) Y_i = 0$ and the relative translation $t_{i,j} = t_j - R_{i,j} t_i$: $B = (I_3 - X_i e_3^T) R_{\varsigma,j} X_\varsigma a^T$, $C = (I_3 - X_i e_3^T) \theta_{\varsigma,\eta}^2$, $D = -BR_{\varsigma,\eta} + CR_{\varsigma,i}$;

step 5: repeating step 3 to step 4 for other 3D points, constructing a linear equation, and solving the global translation $\hat{t}$;

step 6: reconstructing the global translation of the marked views according to $t_i = t_l$ by using $\hat{t}$ and $t_r$; and step 7: screening out the correct solution of the global translation t according to $a^T t_{\varsigma,\eta} \geq 0$.

4. The pure pose solution method according to claim 3, further comprising a camera pose optimization step between the GTL calculation step and the SAR step, wherein the camera pose optimization step comprises:

expressing image homogeneous coordinates $f_i$ of the 3D point $X^W$ on the view i, wherein
$f_i \sim d_\varsigma^{(\varsigma,\eta)} R_{\varsigma,i} X_\varsigma + t_{\varsigma,i}$ wherein $\sim$ represents the equation under homogeneous coordinates, $d_\varsigma^{(\varsigma,\eta)} = \|[X_\eta]_x t_{\varsigma,\eta}\|/\theta_{\varsigma,\eta}$, and a re-projection error is defined, wherein $$\varepsilon_i = \frac{f_i}{e_3^T f_i} - \tilde{f}_i$$

wherein $e_3^T = (0,0,1)$, $\tilde{f}_i$ represents image coordinates of the 3D point on the view i and a third element of $\tilde{f}_i$ is 1; for views of the 3D point, a re-projection error vector $\varepsilon$ is formed; for the 3D points, an error vector $\Sigma$ is formed; a target function of a global pose optimization is described as $\arg\min \Sigma^T \Sigma$, and an optimization solution of the global pose is calculated; and the camera pose optimization step is further replaced with a classic bundle adjustment (BA) algorithm, wherein 3D scene point coordinates are configured by an output result of the classic BA algorithm, or the 3D scene point coordinates are obtained by using the SAR step.

5. The pure pose solution method according to claim 3, wherein the SAR step further comprises:

performing an analytical and weighted reconstruction on a multi-view 3D scene structure according to a camera pose;

for the current 3D point, calculating a depth of field in the left baseline view $\varsigma$, wherein $$\hat{z}_\varsigma^W = \sum_{\substack{1 \leq j \leq n \\ j \neq \varsigma}} \omega_{\varsigma,j} d_\varsigma^{(\varsigma,j)}$$

calculating a depth of field in the right baseline view, wherein $$\hat{z}_\eta^W = \sum_{\substack{1 \leq j \leq n \\ j \neq \eta}} \omega_{j,\eta} d_\eta^{(j,\eta)}$$

wherein $d_\eta^{(j,\eta)} = \|[R_{j,\eta} X_j]_x t_{j,\eta}\|/\theta_{j,\eta}$, $\omega_{\varsigma,j}$ and $\omega_{j,\eta}$ represent weighting coefficients; and performing the analytical reconstruction to obtain a first category of the coordinates of the 3D points; or performing the analytical reconstruction to obtain a second category of the coordinates of the 3D points by using the depth of field in the right baseline view, or calculating an arithmetic mean of the first and second categories of the coordinate values of the 3D points.

6. An application specific integrated circuit comprising a pure pose solution system for a multi-view camera pose and scene, comprising:

a pure rotation recognition (PRR) module, wherein the PRR module is configured to perform a PRR on views, and mark views having a pure rotation abnormality of the views to obtain marked views and non-marked views;

a global translation liner (GTL) calculation module, wherein the GTL calculation module is configured to select one of the non-marked views as a reference view, construct a constraint $t_r = 0$, construct a GTL constraint, solve a global translation $\hat{t}$, reconstruct a global translation of the marked views according to $t_r$ and $\hat{t}$, and screen out a correct solution of the global translation; and a structure analytical reconstruction (SAR) module, wherein the SAR module is configured to perform an analytical reconstruction on coordinates of 3D points according to a correct solution of a global pose, wherein the PRR module further comprises:

a module M1, wherein the module M1 is configured to: for a view i ($1 \leq i \leq N$) and a view j ($j \in V_i$), calculate $\theta_{i,j} = \|[X_j]_x R_{i,j} X_i\|$ by using image matching point pairs $(X_i, X_j)$ and a relative attitude $R_{i,j}$ of dual views (i,j) and construct a set $\Theta_{i,j}$ and a set $$\Theta_i = \bigcup_{j \in V_i} \Theta_{i,j},$$

wherein a proportion of elements, greater than $\delta_1$, in $\Theta_i$ is denoted by $\gamma_i$.

7. The pure pose solution system according to claim 6, wherein the PRR module further comprises:
 a module M2, wherein the module M2 is configured to: when $\gamma_1 < \delta_2$, mark the view i as a pure rotation abnormality view, record a mean value of elements in the set $\Theta_{i,j}$ as $\bar{\theta}_{i,j}$, let $$l = \underset{j \in V_i}{\operatorname{argmin}}\{\bar{\theta}_{i,j}\}$$

and construct a constraint $t_i = t_l$;
 wherein when a 3D point $X^W = (x^W, y^W, z^W)^T$ is visible in n ($\leq N$) views, for i=1, 2 ..., n, $V_i$ is a set configured with co-views of the view i; $X_i$ and $X_j$ represent a normalized image coordinate of the 3D point $X^W$ on the view i and a normalized image coordinate of the 3D point $X^W$ on the view j, respectively; $\delta_1$ and $\delta_2$ are specified thresholds; $R_i$ and $t_i$ represent a global attitude of the view i and a global translation of the view i, respectively; $R_{i,j}$ ($=R_j R_i^T$) and $t_{i,j}$ represent a relative attitude of the dual views (i,j) and a relative translation of the dual views (i,j), respectively; and $[X_j]_x$ represents an antisymmetric matrix formed by vectors $X_j$; and
 a module M3, wherein the module M3 is configured to repeat operations of the module M1 to the module M2 for the views.

8. The pure pose solution system according to claim 7, wherein the GTL calculation module comprises:
 a module M4, wherein the module M4 is configured to: for a current 3D point, select views $$(\varsigma, \eta) = \underset{1 \leq i, j \leq n}{\operatorname{argmax}}\{\theta_{i,j}\},$$

wherein $\varsigma$ is a left baseline view, and $\eta$ is a right baseline view;
 a module M5, wherein the module M5 is configured to: for the non-marked views, construct the GTL constraint according to a form of $Bt_\eta + Ct_\varsigma + Dt_\varsigma = 0$;
 wherein the normalized image coordinate of the 3D point $X^W$ on the view i comprise $X_i \sim R_{\varsigma,i} X_\varsigma a^T t_{\varsigma,\eta} + \theta^2_{\varsigma,\eta} t_{\varsigma,i} \triangleq Y_i$, $\sim$ represents an equation under homogeneous coordinates, $a^T = -([X_\eta]_x R_{\varsigma,\eta} X_\varsigma)^T [X_\eta]_x$, and a superscript T represents a transposition of a matrix or a transposition of a vector;
 wherein the relative translation $t_{i,j}$ has different forms corresponding to the global translation, a matrix B, a matrix C, and a matrix D have different forms:
 (1) for a target function $[X_i]_x Y_i = 0$ and the relative translation $t_{i,j} = R_j(t_i - t_j)$: $B = [X_i]_x R_{\varsigma,i} X_\varsigma a^T R_\eta$, $C = [X_i]_x \theta^2_{\varsigma,\eta} R_i$, $D = -(B+C)$;
 (2) for a target function $(I_3 - X_i e_3^T) Y_i = 0$ and the relative translation $t_{i,j} = R_j(t_i - t_j)$: $B = (I_3 - X_i e_3^T) R_{\varsigma,i} X_\varsigma a^T R_\eta$, $C = (I_3 - X_i e_3^T) \theta^2_{\varsigma,\eta} R_i$, $D = -(B+C)$;
 (3) for the target function $[X_i]_x Y_i = 0$ and the relative translation $t_{i,j} = t_j - R_{i,j} t_i$: $B = [X_i]_x R_{\varsigma,i} X_\varsigma a^T$, $C = [X_i]_x \theta^2_{\varsigma,\eta}$, $D = -(BR_{\varsigma,\eta} + CR_{\varsigma,i})$; and
 (4) for the target function $(I_3 - X_i e_3^T) Y_i = 0$ and the relative translation $t_{i,j} = t_j - R_{i,j} t_i$: $B = (I_3 - X_i e_3^T) R_{\varsigma,i} X_\varsigma a^T$, $C = (I_3 - X_i e_3^T) \theta^2_{\varsigma,\eta}$, $D = -(BR_{\varsigma,\eta} + CR_{\varsigma,i})$;

a module M6, wherein the module M6 is configured to repeat operations of the module M4 to the module M5 for other 3D points, construct a linear equation, and solve the global translation $\hat{t}$;
 a module M7, wherein the module M7 is configured to reconstruct the global translation of the marked views according to $t_i = t_l$ by using $\hat{t}$ and $t_r$; and
 a module M8, wherein the module M8 is configured to screen out the correct solution of the global translation t according to $a^T t_{\varsigma,\eta} \geq 0$.

9. The pure pose solution system according to claim 8, further comprising a camera pose optimization module, wherein the camera pose optimization module is configured to:
 express image homogeneous coordinates $f_i$ of the 3D point $X^W$ on the view i, wherein
 $f_i \sim d^{(\varsigma,\eta)}_\varsigma R_{\varsigma,i} X_\varsigma + t_{\varsigma,i}$
 wherein $\sim$ represents the equation under homogeneous coordinates, $d^{(\varsigma,\eta)}_\varsigma = \|[X_\eta]_x t_{\varsigma,\eta}\| / \theta_{\varsigma,\eta}$, and a re-projection error is defined, wherein $$\varepsilon_i = \frac{f_i}{e_3^T f_i} - \tilde{f}_i$$

wherein $e_3^T = (0,0,1)$, $\tilde{f}_i$ represents image coordinates of the 3D point on the view i and a third element of $\tilde{f}_i$ is 1; for views of the 3D point, a re-projection error vector $\varepsilon$ is formed; for the 3D points, an error vector $\Sigma$ is formed; a target function of a global pose optimization is described as arg min $\Sigma^T \Sigma$, and an optimization solution of the global pose is calculated; and
 the camera pose optimization step is further replaced with a classic BA algorithm, wherein 3D scene point coordinates are configured by an output result of the classic BA algorithm, or the 3D scene point coordinates are obtained by using the SAR module.

10. The pure pose solution system according to claim 8, wherein the SAR module is further configured to:
 perform an analytical and weighted reconstruction on a multi-view 3D scene structure according to a camera pose;
 for the current 3D point, calculate a depth of field in the left baseline view $\varsigma$, wherein $$\hat{z}^W_\varsigma = \sum_{\substack{1 \leq j \leq n \\ j \neq \varsigma}} \omega_{\varsigma,j} d^{(\varsigma,j)}_\varsigma$$

calculate a depth of field in the right baseline view, wherein $$\hat{z}^W_\eta = \sum_{\substack{1 \leq j \leq n \\ j \neq \eta}} \omega_{j,\eta} d^{(j,\eta)}_\eta$$

wherein $d^{(i,j)}_\eta = \|[R_{j,\eta} X_j]_x t_{j,\eta}\| / \theta_{j,\eta}$, $\omega_{\varsigma,j}$ and $\omega_{j,\eta}$ represent weighting coefficients; and
 perform the analytical reconstruction to obtain a first category of the coordinates of the 3D points; or perform the analytical reconstruction to obtain a second category of the coordinates of the 3D points by using the depth of field in the right baseline view, or calculate an arithmetic mean of the first and second categories of the coordinate values of the 3D points.

11. The pure pose solution system according to claim 6, wherein the PRR module, the GTL calculation module, and the SAR module further comprise at least one of computer-readable program code, a logic gate, a switch, an application-specific integrated circuit, a programmable logic controller, or an embedded microcontroller.

* * * * *